April 30, 1968    F. M. HILLE    3,380,549
SAFETY DEVICE CONTROLLING VEHICLE EMERGENCY BRAKE
Filed May 5, 1966
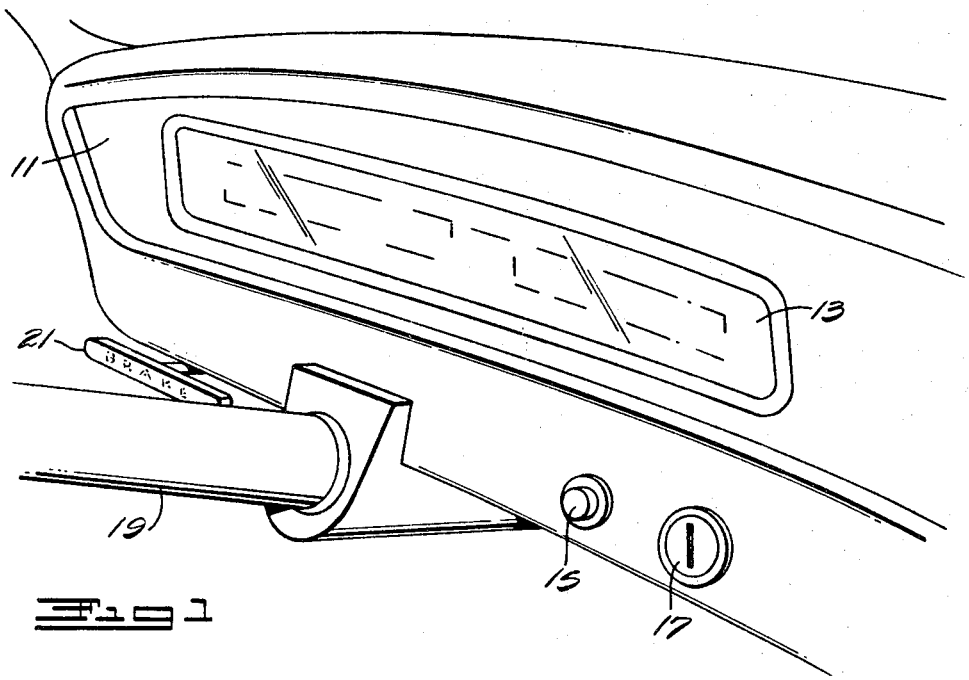
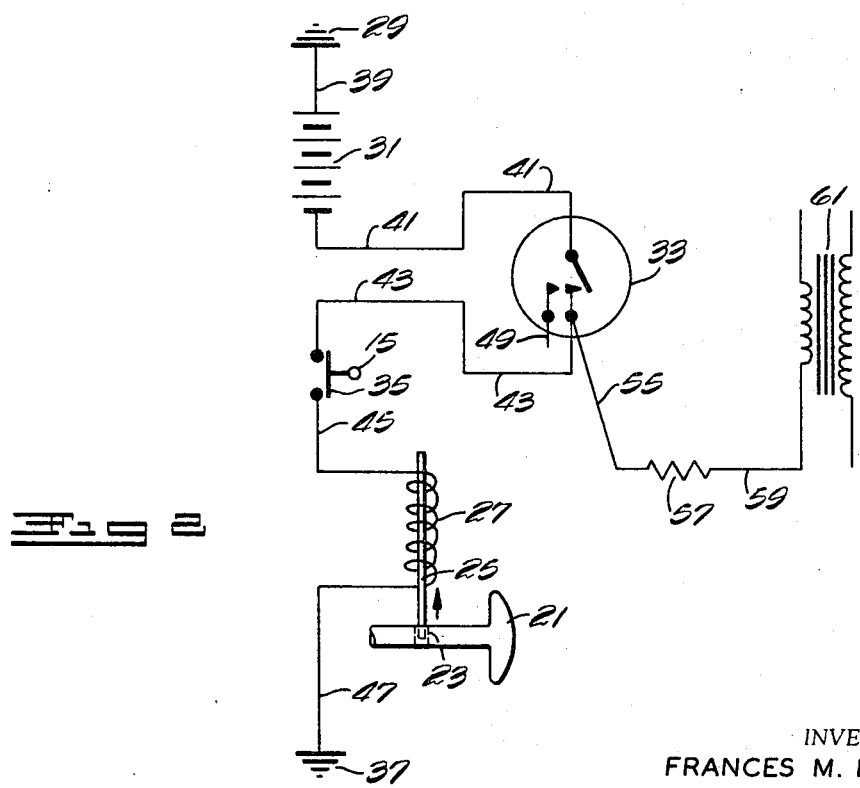
INVENTOR.
FRANCES M. HILLE
BY
Cox and Sheridan
ATTORNEYS

United States Patent Office 3,380,549
Patented Apr. 30, 1968

3,380,549
SAFETY DEVICE CONTROLLING VEHICLE
EMERGENCY BRAKE
Frances M. Hille, 735 Maple Heights Drive,
Galion, Ohio 44833
Filed May 5, 1966, Ser. No. 547,850
1 Claim. (Cl. 180—114)

ABSTRACT OF THE DISCLOSURE

There is disclosed structure for the prevention of automobile accidents by undesired release of the emergency brake. This structure includes an emergency brake rod extending substantially horizontally and formed with a substantially vertical hole into which a locking rod tends to drop when the brake is applied. A solenoid in series with the ignition switch and a manually operated switch is provided for raising the locking rod when it is desired to release the brake. However, the ignition must be turned on with a key and the manual switch intentionally operated.

Background of the invention

This invention disclosed and claimed in the following application relates to safety devices and more particularly concerns a safety device for the prevention of automobile collisions and injuries due to the unauthorized or accidental release of an automobile emergency brake control.

The term "emergency brake" as used in this application is synonymous with "hand brake," "parking brake," "stationary brake," or any other term which may reasonably be interpreted to means emergency brake, hand brake parking brake, or stationary brake. By the term "emergency brake" as used in this aplication is meant any device, or devices, which are attached to or a part of an automobile and which are used primarily to prevent motion of the wheels of said automobile after said automobile has been stopped.

The term "emergency brake control" as used in this application means any rod, bar, tube, shaft, wire, coiled wire, any combination thereof, or similar instrument which has a handle on it and which is usually used by the operator of the automobile to apply and release the emergency brake or is used solely to release the emergency brake.

In addition to brakes which are usually operated by a foot pedal for immediate deceleration, automobiles are usually also equipped with an emergency brake, which is normally used to hold the automobile stationary after it has been stopped or parked. In many automobiles, the emergency brake is applied and released by the operator by means of an emergency brake control which is pulled to apply and pushed to release. In other automobiles the emergency brakes is applied by the operator by means of a foot pedal and is released by means of an emergency brake control, which may be pushed or pulled to release. Heretofore, the ease with which the emergency brake can be released has been a source of many auto accidents and personal injuries resulting therefrom. It sometimes happens that unauthorized persons, especially children, get into an automobile, which is being held on an incline by the automobile's emergency brake, and accidentally or intentionally release the emergency brake. The automobile then may roll down the incline uncontrolled and in many instances damages itself and/or other property and injures unaware bystanders and/or the persons who released the emergency brake.

Objects

Accordingly, it is an object of this invention to overcome the aforementioned source of accidents which its responsible for property damage, personal injury, and occasional loss of life.

It is another object of this invention to provide a safety means for preventing the release of the emergency brake of an automobile except when it is definitely intended by the person in control of the automobile that the emergency brake should be released.

It is another object of this invention to provide a safety lock for the emergency brake control, which is controlled by a solenoid in an electrical circuit.

It is another object of this invention to provide a safe emergency brake control which, when the emergency brake is applied, is held locked and stationary by a latch or a solenoid protrusion and stop means which latch or protrusion and stop means is controlled electrically by a solenoid, which solenoid is connected electrically with the ignition switch and is operative only when the ignition switch is closed and when a separate manually operated switch is also closed.

Further objects and features of the invention will become apparent from the following specifications and claims and from a consideration of the accompanying drawings illustrating one embodiment of the invention.

In the drawings:

FIG. 1 is a perspective view of a portion of an automobile showing the steering column, the dashboard, the emergency brake control, the key control for the ignition switch, and a hand control for a special switch.

FIG. 2 is a diagrammatic or schematic view illustrating one electrical circuit which may be used to control the release of the emergency brake.

Detailed description

Referring now in detail to the drawings, it may be seen that I have shown in FIG. 1 a dashboard 11 of an automobile having indicating devices 13, and having associated therewith a pushbutton 15, and a keyhole 17 for the opening and closing of the ignition switch 33 (FIG. 3). Adjacent thereto is a steering column 19 and an emergency brake control handle 21 the handle being supplied in some cases for the purpose of applying and releasing, or in other cases for the purpose of simply releasing, the emergency brake of the automobile. As shown in FIG. 2 the emergency brake control of the automobile is provided with an aperture or stopping means into which or against which an end of a rod 25 is adapted to move. The rod 25 is controlled by a solenoid 27 and the solenoid 27 is controlled by an electric circuit including a ground 29, a battery 31, an ignition switch 33, and a manually operated switch 35. The manually operated switch 35 is controlled by the pushbutton 15, and leads from the switch 35 are connected to the solenoid 27 and ignition switch 33. Specifically, a lead 39 connects the ground 29 with battery 31, a lead 41 connects the battery 31 with the switch 33, a lead 43 connects the switch 33 with the switch 35, a lead 45 connects the switch 35 with the solenoid 27, and a lead 47 connects the solenoid 27 with the ground 37. Lead 49 connects the switch 33 to the starter. Lead 55 connects switch 33 to resistance 57, a lead 59 connects resistance 57 to ignition coil 61.

Operation

In operation, when the automobile is parked or stopped in some automobiles the emergency brake control handle 21 should be pulled out to hold the automobile stationary, or, in some automobiles the emergency brake foot pedal should be pushed in so as to apply the emergency brake and the foot pedal should be locked in such position subject to being released by a handle such as 21. The rod 25 is forced into the aperture 23 by a spring forming a part of the solenoid in a conventional manner. Should an unauthorized person attempt to release the emergency brake control 21, he cannot do so because the rod 25 is engaged in the aperture 23 or against some sort of stop means and thus prevents release of the emergency brake control 21. However, when the driver desires to drive the automobile, he inserts the key in the ignition keyhole 17, and closes the ignition switch 33, thus energizing the starter and starting the engine and supplying electrical current through the ignition circuit. Then, to release the emergency brake, via the emergency brake handle or control 21, the operator pushes the button 15, thus closing the circuit from the battery 31 through ignition switch 33 and manually operated switch 35 and the solenoid 27, and thus causing the rod 25 to be withdrawn from the aperture 23 or other type of stop means. The emergency brake control handle 21 is then released by the driver or by itself automatically since it is free to move, and the emergency brake is correspondingly released so that the automobile may be driven.

It is to be understood that while the above described embodiment of my invention is a preferred embodiment it is supplied for the purpose of illustration only and various changes may be made therein without departing from the scope of the invention.

I claim:

1. For an automobile provided with an emergency brake and an engine controlled by an ignition system, the improvement consisting of the combination of a control for said emergency brake consisting of a brake shaft positioned substantially horizontally, provided with a handle, and formed with a substantially vertical hole extending therethrough;

a rod movable into and out of said hole;

an electrical means consisting of a solenoid positioned directly above said hole for moving said rod out of said hole; and means for energizing said solenoid comprising an electrical circuit including a battery, a key operated switch which is interposed in said circuit and also energizes the ignition system, and a manually operated switch also interposed in said circuit, whereby said brake shaft is held locked in operating position when after application thereof the ignition is deactivated, until the ignition system is reactivated and the manual switch is simultaneously operated to lift the movable rod vertically upward out of said hole.

References Cited

UNITED STATES PATENTS

| | | | |
|---|---|---|---|
| 1,201,390 | 10/1916 | Theobald | 340—63 |
| 1,972,300 | 9/1934 | Hemingway | 70—181 |
| 2,000,136 | 5/1935 | Huss | 340—64 |
| 2,890,581 | 6/1959 | Lewis | 70—248 |
| 2,968,378 | 1/1961 | Yanda. | |

KENNETH H. BETTS, *Primary Examiner.*